(12) United States Patent
Sullivan et al.

(10) Patent No.: US 7,518,519 B2
(45) Date of Patent: Apr. 14, 2009

(54) RFID TAG SENSITIVITY

(75) Inventors: Michael S. Sullivan, Northborough, MA (US); Jamshed H. Dubash, Shrewsbury, MA (US)

(73) Assignee: The Gillette Company, Boston, MA (US)

( * ) Notice: Subject to any disclaimer, the term of this patent is extended or adjusted under 35 U.S.C. 154(b) by 0 days.

(21) Appl. No.: 12/002,688

(22) Filed: Dec. 18, 2007

(65) Prior Publication Data

US 2008/0106416 A1     May 8, 2008

Related U.S. Application Data

(60) Division of application No. 11/117,206, filed on Apr. 28, 2005, now Pat. No. 7,378,967, which is a continuation-in-part of application No. 10/936,972, filed on Sep. 9, 2004, now Pat. No. 7,161,489, and a continuation-in-part of application No. 10/936,971, filed on Sep. 9, 2004.

(51) Int. Cl.
   *G08B 13/14* (2006.01)
(52) U.S. Cl. .............. 340/572.1; 340/572.2; 340/572.4; 340/539.1; 340/539.19; 340/539.21; 340/825.69; 340/10.1
(58) Field of Classification Search .............. 340/572.1, 340/572.2, 572.3, 572.4, 539.1, 539.19, 539.21, 340/539.23, 825.49, 825.69, 825.72, 10.1, 340/10.3; 235/375, 376
   See application file for complete search history.

(56) References Cited

U.S. PATENT DOCUMENTS

| | | | |
|---|---|---|---|
| 5,648,765 A | 7/1997 | Cresap et al. | |
| 5,686,902 A | 11/1997 | Reis et al. | |
| 6,104,291 A | 8/2000 | Beauvillier et al. | |
| 6,908,034 B2 * | 6/2005 | Alleshouse | ................ 235/432 |
| 2002/0127970 A1 | 9/2002 | Martinez | |
| 2002/0149215 A1 | 10/2002 | McLaughlin | |
| 2002/0149480 A1 | 10/2002 | Shanks et al. | |
| 2003/0033032 A1 | 2/2003 | Lind | |

(Continued)

FOREIGN PATENT DOCUMENTS

EP     1 359 538     11/2003

OTHER PUBLICATIONS

PCT Search Report dated Sep. 15, 2006—11 pgs.
"Technical Report 13.56 MHz ISM Band Class 1 Radio Frequency Identification Tag Initerface Specification: Candidate Recommendation, Version 1.0.0," 2003, Auto ID Center, Massachusetts Institute of Technology.

(Continued)

*Primary Examiner*—Hung T. Nguyen
(74) *Attorney, Agent, or Firm*—Brion A. Berman; Kevin C. Johnson; Steven W. Miller

(57) ABSTRACT

Systems, methods, or computer program products may collect information about the performance of individual RFID tags. In particular, signal strength and/or signal sensitivity of individual RFID tags may be measured and the resulting performance information may be stored in a data repository. In the data repository, the performance information for an individual tag may be associated with an identifier that is uniquely associated with the tag. In one exemplary embodiment, the performance information may be used by an on-line system configured to automatically determine the performance margin with which RFID tags are being read in an RFID system, or to automatically tune the RFID system to achieve a desired performance margin.

3 Claims, 9 Drawing Sheets

U.S. PATENT DOCUMENTS

| | | | |
|---|---|---|---|
| 2003/0150908 A1 | 8/2003 | Pokorny et al. | |
| 2003/0150909 A1 | 8/2003 | Markham et al. | |
| 2003/0154144 A1 | 8/2003 | Pokorny et al. | |
| 2003/0158795 A1 | 8/2003 | Markham et al. | |
| 2003/0220711 A1 | 11/2003 | Allen | |
| 2004/0139106 A1* | 7/2004 | Bachman et al. | 707/104.1 |
| 2006/0022815 A1* | 2/2006 | Fischer et al. | 340/505 |

OTHER PUBLICATIONS

Zeller, "RFID Test Plan Draft Only" presented to ISO/IEC SC31 Wg3/SG1 on Dec. 16, 2001 @http://216.329.51.104/search?q=cache:p7JDa6AoQKAJ:www.autoid.org/2002__ Documents....

"RFID Update: The Basics, The Wal-Mart Mandate, EPC, Privacy Concerns, and More," @ http://www.inventoryops.com/RFIDupdate.htm (Last modified May 21, 2004).

"Technology Guide," Auto ID Center, Massachusetts Institute of Technology, Auto-ID Center White Paper, 2002.

"Transponder News Dynamic Peformance of Passive-Tag Inductive RFID Systems," @ http://rapidttp.com/transpoder/beige11.html (Revision: Feb. 21, 1999).

Linster et al., "RFID in the Supply Chain: Improving Peformance through Greater Visibility," Avicon Whitepaper @ http://www.avicon.com/pdfs/papers/AviconRFID.pdf (Last saved Jan. 7, 2004 by Marc Linster).

Provia Sofware @ http://www.provia.com/solutions.asp (Printed Jul. 21, 2004).

* cited by examiner

RFID TAG SENSITIVITY

CROSS-REFERENCE TO RELATED APPLICATIONS

This application is a divisional application of U.S. patent application Ser. No. 11/117,206, filed on Apr. 28, 2005, now U.S. Pat. No. 7,378,976, which is in continuation-in-part of U.S. patent application Ser. No. 10/936,972, filed on Sep. 9, 2004, now U.S. Pat. No. 7,161,489, and a continuation-in-part of U.S. patent application Ser. No. 10/936,971, filed on Sep. 9, 2004.

TECHNICAL FIELD

This invention relates to monitoring the performance of RFID systems using sensitivity information for individual RFID tags.

BACKGROUND

Radio frequency identification (RFID) systems are capable of wirelessly detecting individual RFID tags (herein referred to as "tags") as they pass in the vicinity of an RFID reader. Unlike bar codes, which are read individually and must be in the optical line-of-sight of the scanner, RFID tags can rapidly read a large number of tags that are within a region around a reader, such as a number of tagged products that are together on a shelf or a pallet. Moreover, tags may be read through some materials, such as paper or plastic packaging material used to ship cases or pallets of products. As such, individual products may be tagged and read after being placed in a container for storage or shipment.

RFID tags may be wafer-thin, microchip-based tags about the size of a large postage stamp. The tags may include antenna features capable of receiving radio frequency energy to communicate with a reader. Typically, a reader may detect a tag by transmitting radio frequency (RF) energy at a particular frequency and with a particular modulation. A tag within the appropriate range of the reader may be energized by the RF energy received via the tag's antenna. The energized tag may respond by generating or reflecting an RF signal that may be detected by the reader's antenna and receiver. The signal sent by the tag may be encoded with information, such as a serial number, electronic product code (EPC), stock keeping unit (SKU), or other identifying information. After the reader receives and decodes the identifying information, the presence of the tag may be recorded or stored for various uses. When individual tags are associated with products in a distribution chain, for example, uses may include, but are not limited to, inventory management, product tracking, billing, loss prevention, or ordering.

Product tracking in a distribution chain may use RFID systems to track inventory, for example, at various control points in a manufacturing plant, distribution centers, warehouses, and retail outlets. In a practical large scale RFID system, not all tags may be read. In the distribution chain context, RFID system performance may generally refer to the reliability with which tags are read as products move through the distribution chain.

At each of these points, the margin by which tags are satisfactorily read is subject to various parameters, such as temperature and humidity conditions, electromagnetic interference (EMI), reader/tag sensitivity, material properties, and numerous other factors that can impact how reliably tags are detected by the RFID system. Accordingly, reliably tracking tags in such environments requires the RFID system to operate under various atmospheric, electromagnetic, and other conditions that can impact RFID system performance.

SUMMARY

Systems, methods, or computer program products may collect information about the performance of individual RFID tags. In particular, signal strength and/or signal sensitivity of individual RFID tags may be measured and the resulting performance information may be stored in a data repository. In the data repository, the performance information for an individual tag may be associated with an identifier that is uniquely associated with the tag. In one exemplary embodiment, the performance information may be used by an on-line system configured to automatically determine the performance margin with which RFID tags are being read in an RFID system, or to automatically tune the RFID system to achieve a desired performance margin.

In an illustrative example, individual tags may be tested to determine a sensitivity level that is associated with the tag. This tag sensitivity information may be combined with other collected information to statistically determine the performance margin at individual nodes in the RFID system. Sensitivity information may be determined as a function of a tag's placement on a particular product, or within a container containing one or more products. Such sensitivity measurement information may be used to improve the accuracy with which error-contributing parameters may be identified in the overall RFID system.

In one aspect, a method of collecting performance information for individual RFID tags includes measuring the performance of a tag, and storing one or more values that represent the measured performance in an information repository. The method further includes associating the stored values with an identifier that is uniquely associated with the tag.

In an embodiment of the method, measuring the performance of the tag may include stimulating the tag with radio frequency (RF) signals at least once at each of a number of field strengths. The measuring further includes attempting to read the tag's response to stimulation at each of the number of field strengths, and determining a first field strength at which the tag is successfully read at an error rate that is less than a first predetermined error rate. In addition, the method may further include determining a second field strength at which the tag is not successfully read at an error rate that is less than the first predetermined error rate. Still further in the method, the first and second determined field strengths may differ by less than a first predetermined amount, and a first of the values that represent a measured performance is based on the first and second determined field strengths. Similarly, additional field strengths may be determined for additional values that represent measured performance.

Various embodiments of the method may also include other features, including: reading the tag at least once at each of a plurality of different spatial positions relative to a reader, such as by placing the tag at different locations or in different spatial orientations; varying the power level transmitted by a reader; or encoding the tag with a code that represents the identifier that is uniquely associated with the tag. An RFID reader may also perform the method.

According to some embodiments, reading a tag successfully may include reading the tag without errors at least a predetermined number of times when a number of attempts are made to read the tag. In still other embodiments, measuring the performance of the tag may include measuring the strength of a RF signal transmitted by the tag in response to the tag receiving RF signals associated with an attempt to read the tag, and then storing one or more values that represent the measured signal strength in an information repository. The stored values of signal strength may be associated with the identifier that is uniquely associated with the tag.

In another aspect, a computer program product is tangibly embodied in an information carrier and contains instructions that, when executed, cause a processor to perform operations to determine the sensitivity of a radio frequency identification tag. One operation may be to measure the sensitivity of a tag by stimulating the tag with RF signals at least once at each of a plurality of field strengths and attempting to read the tag at each of the plurality of field strengths. Another operation may be to store one or more values that represent the measured sensitivity in an information repository. Yet another operation may be to associate the stored values with an identifier that is uniquely associated with the tag.

In yet another aspect, a method of commissioning an RFID tag for use in an RFID system that tracks the movement of article through a supply chain includes measuring the performance of an individual RFID tag and encoding the RFID tag with a unique identifier. The method also includes associating the unique identifier with a first information representing the measured performance, and storing the first information and the unique identifier in an information repository. The method further includes coupling the tag to an article to be tracked as the article moves through the supply chain.

In some embodiments of the method, measuring the performance of an individual RFID tag includes measuring the performance of the tag after the tag has been coupled to the article to be tracked. The method may also include estimating a power level sufficient for one of the RFID readers to read the tag based on the stored first information and adjusting a reader power level according to the estimated power level. The estimated power level may be sufficient to read the least sensitive tag in a group of tags. Estimating a power level sufficient for one of the RFID readers to read the tag based on the stored first information may further include determining a first power level that represents the minimum reader power level required to successfully read the tag at an error rate that is less than the first predetermined error rate, and determining the estimated power level by adding a predetermined margin to the determined first power level.

Some embodiments may provide one or more advantages. For example, the system may provide for the collection of information related to the performance of the RFID system. Tags may be individually measured at commissioning to verify tag performance early in the life cycle, and corrective action may be taken before additional investment is made in reliance on tag performance. Performance information for individual tags, as well as tag lot codes, versions, and other tag-related information may be compiled to quickly and accurately detect or predict the impact of tag parameters on RFID system performance. Information collected by the system may be compiled to facilitate either manual and/or automated analysis to identify sources of disturbances to RFID system performance, as well as to suggest or implement corrective actions to improve performance. The compiled information and analysis may be used by system architects, engineers, and operators to gain insight into performance margins in the RFID system, what factors limit the performance margins, and how the RFID system, the environment, or the operation of the RFID system may be improved.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION OF ILLUSTRATIVE EMBODIMENTS

Figure 1:
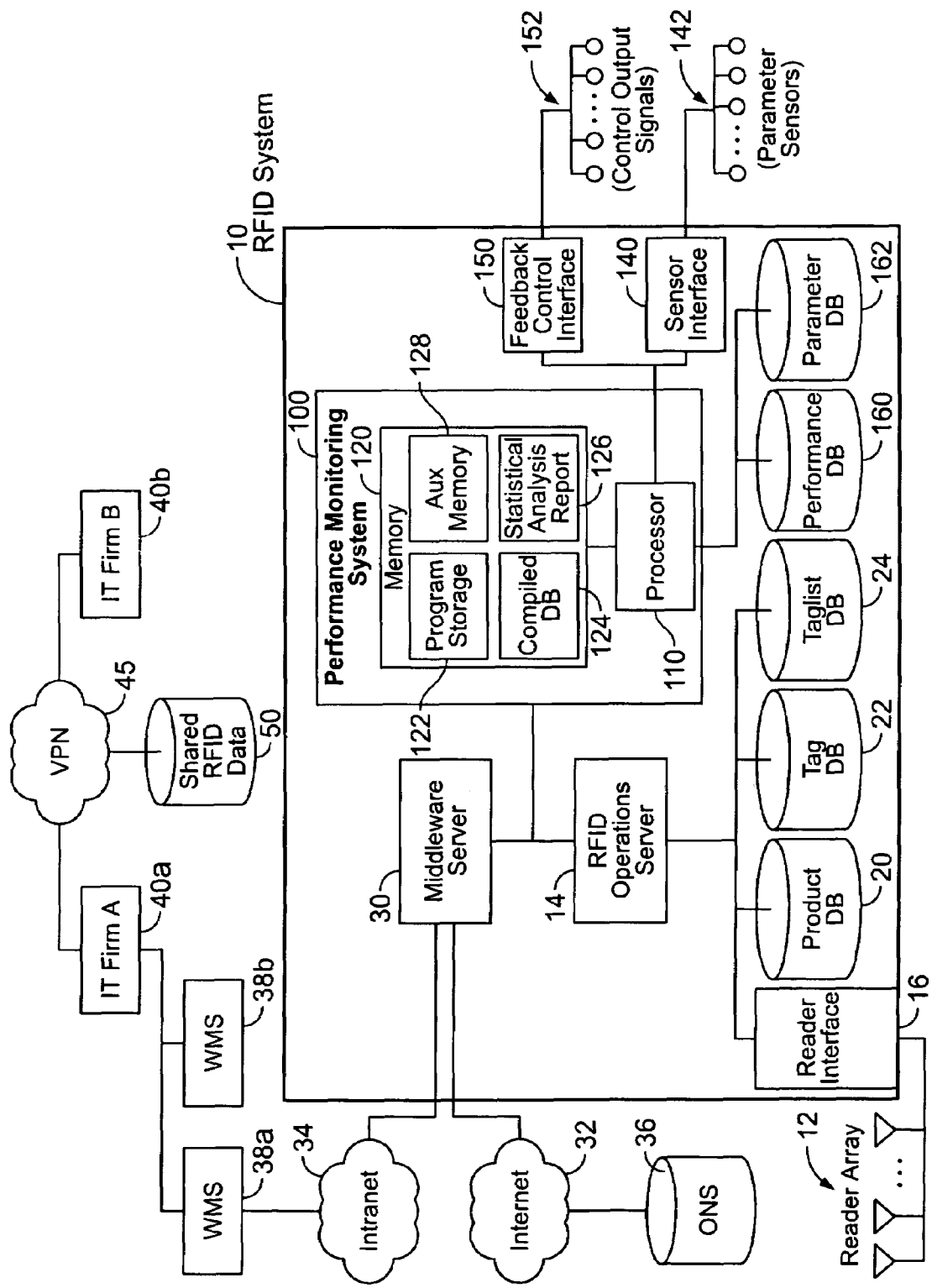
FIG. 1 is a functional block diagram that includes an RFID performance monitoring system.

In one exemplary embodiment, individual tag sensitivity information may be used to enhance an RFID performance monitoring system. An RFID performance monitoring system may collect a variety of performance-related information that relates to tracking RFID tagged items as they move though a distribution chain. The performance monitoring system may analyze the collected information for the purpose of identifying parameters that contribute to reduced reliability of RFID system performance. In various embodiments, the performance monitoring system may perform statistical operations on the collected information to determine their impact on system performance. Providing sensitivity information for individual RFID tags may reduce the uncertainty in the statistical analysis, thereby improving the quality and speed of the output of the RFID performance monitoring system.

In various embodiments, information that is collected for analysis may include performance metrics, such as, for example, tag sensitivity levels, successful reads and read attempts for individual tags. Information may also be collected about product configuration, tag placement and orientation information, time, temperature, humidity, vibration, power line quality, and the like. Information may also be collected about the lot code, version, supplier, and history of tags, readers, and other hardware and software. Furthermore, information may be collected about the product to which each tag is attached, such as information about tag trajectory and velocity, cases, pallets, materials involved, and SKU of products. In addition, information about individual tags may include tag design, vendor, calibrated sensitivity, orientation, version, antenna, lot code, and the like. Other parameters that may relate to system performance may also be monitored, such as the state of a dock door (open or closed), or the energization of a motor, for example.

An RFID performance monitoring system may include systems, methods, or computer program products for collecting information related to the performance of an RFID system. Generally, RFID system performance relates to a measure of how reliably readers in the system identify tags. To assess parameters that may affect RFID system performance, information from a variety of sources may be collected for analysis. The collected information may be analyzed using statistical methods or other tools to identify patterns that indicate sources of error relative to RFID system performance. Accordingly, information may be collected about operational results, system elements, and the environment within which an RFID system may operate. The performance related information may be correlated with other information, such as product information, RFID tag or reader information. Each tag may be uniquely associated with an identifying label, which may allow collected information to be associated with individual tags. The monitoring system may also process the information for the purpose of taking some corrective action. As such, the system may serve as an analytical tool for identifying opportunities to improve RFID system performance.

Many factors can degrade RFID system performance. For example, tag failure may occur. The RFID hardware and software, the atmospheric conditions, tag and reader designs and variability, the trajectory of relative motion between the reader and the tag, and the physical characteristics of the area around the reader are also examples of factors that may affect the reliability with which tags are read in an RFID system.

In some embodiments, a tag may be attached to an individual article, or it may be attached to a container of articles to be tracked by the RFID system. The tag may be attached to an article that has a fixed location, such as a shelf in a distribution center (i.e., or other warehouse), or it may be attached to a mobile article. One example of a mobile article is a forklift. Another example of a mobile article is a consumer (or other) product that may be moved through a supply chain via conveyor, forklift, truck, hand carry, or similar mode of conveyance. The supply chain may include any segment of product flows from an original equipment manufacturer (OEM), through various distribution centers, to retail outlets, and to the end consumer. Along the supply chain, one or more RFID systems may be used to track the movement of tagged articles through the supply chain for various business purposes, such as minimizing loss, improving inventory management, or reducing inventory-related costs, for example.

These business purposes may be best achieved by using a high performance RFID system that reliably reads all tags as they pass by readers. In practical systems, however, there are many potential reasons that a reader may fail to perform, i.e. fail to read 100% of tags that pass by. One way to enhance the business purposes of the RFID system involves identifying factors that hinder performance. If parameters that negatively impact performance can be identified, then mitigation strategies may be developed and corrective actions taken to improve RFID system performance.

An RFID performance monitoring system may be configured to identify parameters that correlate with RFID system performance. An RFID performance monitoring system may be configured to collect, analyze, and share information related to the performance of the RFID system. RFID systems at various points along the supply chain may share information with other RFID systems. Performance information may be analyzed to identify conditions that may improve or degrade RFID system performance, and how reliably tags are read by the RFID system.

One measure of the degree of reliability with which tags are read is referred to herein as performance margin. The greater the performance margin, the lower is the likelihood that tags will not be read properly. As an illustration, if a reader is able to properly read all tags in a pallet at a particular power level, then the performance margin corresponds to how much the reader power level may be reduced before the reader performance would fall below a predetermined and acceptable threshold.

After sources of error or reduced performance margin have been identified, system planners, managers, engineers, and technicians may design and implement mitigation strategies and take corrective actions to improve performance. In some embodiments, the mitigation strategies may include closed-loop feedback control systems configured to automatically take corrective actions without human involvement. In other embodiments, human involvement may be required to perform aspects of the analysis or to take corrective actions.

For ease of understanding, the several aspects of an RFID performance monitoring system will be introduced after a discussion of conventional aspects of an RFID system that is capable of tracking the movement of articles. Next, details of various aspects of operating an RFID performance monitoring system are presented. Then, additional features that may provide enhanced functionality for the performance monitoring system will be explained.

RFID System for Tracking the Movement of Articles

Beginning with FIG. 1, an exemplary RFID system 10 is configured to track the movement of RFID tags ("tags") that are attached to articles to be tracked. Similar to a conventional RFID system, the RFID system 10 is coupled to one or more RFID readers 12. Each reader 12 may include an antenna and a controller that are configured to detect tags within a read field using radio frequency (RF) signals. The RFID system 10 also includes an RFID operations server 14 that may perform functions related to tracking the movement of articles. In this example, the operations server 14 communicates with the readers 12 through a reader interface 16, and it is coupled to a number of information repositories that store information related to tracking the movement of articles. In this example, the information repositories include a product database 20, a tag database 22, and a tag list database 24.

To provide for tracking the movement of articles, the operations server 14 in this example is also coupled to a middleware server 30 that may exchange information with external systems, such as the Internet 32 and/or an intranet 34, for example. Over the Internet 32, the RFID system may have access to a source of unique object names, such as an object name service (ONS) 36. The ONS 36 may provide a unique code such that each tag used in an RFID system may be encoded with information that uniquely identifies that RFID tag. This tag identifying information, which may take the form of a special code (e.g., 64 or 96 bits), may be stored in the tag. One example of such a code is, for example, an electronic product code (EPC). EPCs may be applied to tags to provide each tag with a universally unique serial number. Tags may also be programmed with other information such as, for example, the part number, lot code, manufacturer, or stockkeeping unit (SKU) for the article to which the tag is attached.

Through the intranet 34, the RFID system 10 may exchange information, such as business, accounting, and inventory location information, with a warehouse management system (WMS) 38a. At the WMS 38a level, the computing system may monitor and control one or more independent RFID systems, including RFID system 10. As such, the voluminous data collected by each reader in each RFID system may be summarized for reporting purposes, for example. Multiple WMS's, such as 38a and 38b, may be coupled to a firm's information technology (IT) system so that the RFID tracking data may be integrated with other corporate and high-level management functions. Some RFID information may be made available to other firms in the supply chain. For example, the RFID data may be sent, for example, over a virtual private network (VPN), for storage and retrieval by business partners (e.g., suppliers, distributors, transporters, retailers), such as a firm 40b, that have access to aspects of a shared RFID database 50. Although an exemplary architecture has been described, other network architectures and implementations may also be used.

The foregoing description introduced various aspects of an exemplary system configured to conventionally track movement of articles using an exemplary RFID system with an array of RFID readers. With that background, the performance of such an RFID system may be monitored by a performance monitoring system that will next be described.

RFID Performance Monitoring System

The illustrated RFID system 10 of FIG. 1 further includes an RFID performance monitoring system 100 (hereinafter, "system 100") that may collect information from the RFID system and other sources. The collected information may be analyzed, either by the system 100, or by human operators. One purpose of analyzing the collected information is to identify opportunities for improving the performance of the RFID system 10.

The system 100 includes a processor 110 that is coupled through a bus to a memory 120 for information storage and retrieval. The memory 120 may include program storage memory 122, a compiled database memory 124, a statistical analysis memory 126, and an auxiliary memory 128. Over the bus, the processor 110 may retrieve program instructions stored in the program storage memory 122. The processor 110 may execute the retrieved program instructions and thereby perform functions related to the collection, processing, compilation, analysis, or storage of performance related information. In some embodiments, the program instructions may further cause the processor to take corrective actions to improve RFID system performance, and/or to report processed analytical results to external systems or to human operators.

The processor 110 may be coupled to various devices that receive, send, store, display, or process data and control signals. The connections between the processor 110 and these devices may be, for example, direct (IC to IC), intra-chip (i.e. integrated in a single IC or ASIC), over a parallel bus including address, data, and control lines, over a serial bus (e.g. USB, Ethernet, or controller area network), or a combination of such methods. The signals to and from the processor 110 may include interrupts, control, and hand-shaking signals for operating a processor-based performance monitoring system. Various architectures may be used to implement the functions of receiving, storing, processing, and transmitting information. The processor 110 may be implemented in a single microprocessor or microcontroller, or it may incorporate multiple processors programmed to provide a coordinated operation of the functions described herein. In one embodiment, some operations may be handled by a main microprocessor that delegates the processing of certain analytical functions to a math co-processor, for example.

In this example, the processor 110 is also coupled to a sensor interface 140 and a feedback control interface 150. The sensor interface 140 may be coupled to a number of parametric sensors 142 from which the system 100 may collect information about parameters that may affect the performance of the RFID system 10. For example, the parametric sensors 142 may be used to monitor temperature, relative humidity, vibration, power line quality, operating states of various equipment, such as whether a dock door is open or closed, or whether a certain device (e.g., motor) is active or inactive. Other parameters, such as environmental or other phenomena that may potentially introduce disturbances into the reading of tags may also be monitored. One example of such a sensor may include an RF receiver for detecting and monitoring ambient RF energy that may disrupt the reading of RFID tags.

The feedback control interface 150 may be configured to send a number of control signals 152 to effect corrective action(s) to improve RFID system performance, and/or to report processed analytical results to external systems or to human operators. For example, one control signal 152 may be coupled to one of the readers 12 to allow the system 100 to adjust the power level of the RF signal transmitted by that reader 12. On one hand, the reader power level may be reduced, for example, to reduce unintentional interference with other readers and to avoid reading tags that are not intentionally within the read zone of the reader. On the other hand, reader power level may be increased to increase the likelihood of reading all tags in the read zone of the reader. Whether power level should be increased or decreased to improve RFID system performance may be determined from analysis of the data collected by the system 100.

The processor 110 is also coupled to a performance database 160 and a parameter database 162. In this example, the databases 160-162 may provide a repository for data collected by the system 100. For example, the processor 110 may receive performance-related data from the RFID operations server 14, process the data using methods that will be described below, and store the results from the processing into the performance database 160 or the compiled database 124. When handling either product or performance-related data (stored in databases 20-22) that is associated with a particular tag, the processor may store the processed information in a way that uniquely associates the information with a stored tag identifier, such as an EPC.

The processor 110 may store information received from the sensors 142 in the parameter database 162. In some embodiments, information collected from the parametric sensors 142 may be associated with a particular reader in the reader array 12, for example, while other information may be associated with positional or other reference information, such as a particular dock door in a distribution center, or a particular piece of equipment. Such associated information may be analyzed with other collected information, for example, to locate the source of RFID system performance problems.

Collected information may be compiled into the database 124. The information compiled may be processed or filtered according to programmed instructions executed by the processor 110. The compiled data may be stored directly into memory 124 at the time it is collected, or it may be stored or derived from information initially stored in another database, such as databases 20-24, 160-162, or other (external) database accessible by the processor 110 via the Internet 32 or the intranet 34. Other information may be received from information stored on an information carrier, such as a floppy disk, CD, flash card, or tape, or other data storage medium or device. In some embodiments, the information may be compiled "online," being effectively added to the compiled database 124 as it is being received by the RFID system 10 in real time. In some examples, the processor 110 may perform "off-line" processing of the compiled data in the database 124.

In certain embodiments, the processor 110 may execute program instructions stored in the program storage 122 to process the information as it is being compiled into the compiled database 124. Some processing may associate the information being received with other information, such as EPC numbers, time information, location information, or other information so that analysis may reveal meaningful relationships between parameters. Some processing may filter the incoming data, for example, to reduce redundancy or to eliminate non-useful (e.g., null value) information. Other processing may include developing indices or other metadata on certain parameters or fields in the database by which database searches may be improved. Other pre-processing may be performed to format or build the compiled database for analysis. In some embodiments, time information (e.g., a time stamp) may be associated with some information as it is being added to the database. While compiling information into the database 124, the processor 110 may request supplementary information from other sources, such as the WMS 38a-38b, or the IT 40.

After processing the data in the compiled database 124, the processor 110 may store some of the results in a memory location such as the statistical analysis report memory 126. The information stored therein may be formatted and structured for convenient review and access by various utilities, such as graphical display programs for generating graphical displays on a display device viewable by an operator. The graphical output may be updated continuously in real-time, at periodic intervals, or as requested by an operator. Longer-term or historical results information may be reviewed by the operator using, for example, a computer terminal or other input/output device for accessing the reporting information. Such displays may incorporate graphical output capable of illustrating trends and status information in various graphical, tabular, or other reporting formats. Alarm conditions may be displayed to indicate that parameters or performance-related information or processed results fall outside predetermined acceptable limits.

In addition to visual display information, advanced reporting capabilities may be included in the system 100. For example, the system 100 may be configured to send various levels of compiled or processed information and results to the middleware server 30, the WMS 38a-38b, and the IT firm 40a. The information may be sent on a routine basis, or in response to requests. The information may also be sent when the processor 110 detects certain predetermined conditions. For example, if tags associated with a particular manufacturer lot code are determined to have less than satisfactory performance, then a message may be generated and sent to the WMS 38a-38b or Firm IT 40a-40b to notify appropriate personnel to, for example, reject further use of tags from the unsatisfactory lot code. In a related example, the system 10 may send a control signal 152 to increase the power level and/or the number of reads attempted by readers 12 that may be attempting to read tags of the unsatisfactory lot code. As illustrated by these examples, a number of different corrective actions may be taken when a performance-related problem is identified.

As an example of locating the source of a performance problem, sensors 142 may be configured to measure temperatures at various locations in the environment of the RFID system 10. In one embodiment, at least some temperature sensors 142 are in close proximity to some of the readers 12. By collecting the temperature around readers 12 at various locations in a distribution center, for example, the impact of temperature on the performance of individual readers may be determined. After identifying specific readers that have temperature-related performance problems, the source of a performance problem may be located. This location information may provide additional bases upon which to select corrective actions. In this example, potential corrective actions may include: re-routing the flow of articles to readers that are less sensitive to temperature-related performance degradation; replacing the affected reader or tags with ones that are less sensitive to temperature; relocating the reader to reduce temperature fluctuations (e.g. away from dock doors); providing local temperature regulation for the reader (e.g., cooling fan, heat lamp, or other HVAC equipment); adjusting reader power level to compensate for temperature variations; increasing the number of read attempts; varying the physical product/tag configuration on pallets; or, changing the type of tags being used. These examples represent some potential mitigation strategies that may be used to reduce the effect of temperature variations on a particular reader whose performance has been identified as sensitive to temperature variation. As such, this example illustrates how corrective actions may be based on an analysis of the impact of various parameters collected by the system 100.

In various embodiments, the RFID system 10 and RFID performance monitoring system 100 may be configured differently than the illustrative embodiment of FIG. 1. For example, various elements may be implemented on a single computing platform, such as a single server, desktop or laptop computer. Alternatively, certain of the various elements in the RFID system 10 and the RFID performance monitoring system 100 may be implemented in distributed computing platforms and may use other hardware and software, including servers, PCs, laptops, mainframes, programmable logic controllers (PLCs), hand held computing devices, interfaces, and the like. As such, the elements may exchange information using wired and/or wireless communication protocols, such as USB, Bluetooth, RS-232, Ethernet or other communication methods involving, for example infrared, RF, or fiber optics. Similarly, the databases 20-24 and 160-162 may be implemented in a single data storage device, along with the memory elements 120-126, or in any combination of separate storage devices. Storage devices may include any suitable memory devices such as, for example, disk drives, flash devices, EEPROM, RAM, or ROM.

RFID Performance Monitoring in an Exemplary Supply Chain

Figure 2:
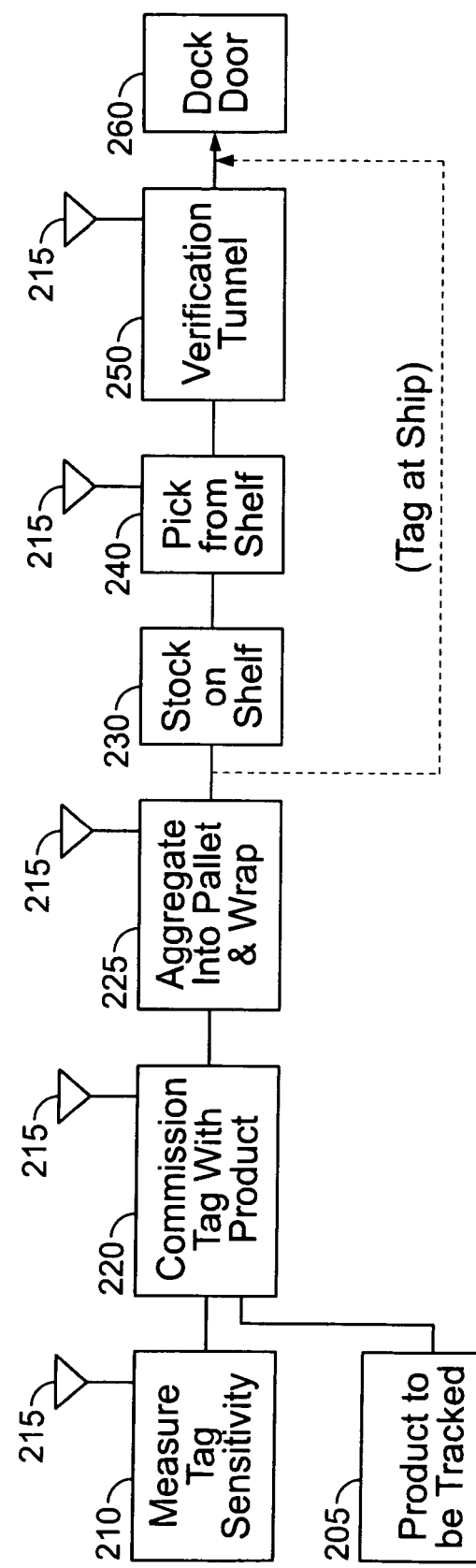
FIG. 2 is a process flow diagram that may use the RFID performance monitoring system of FIG. 1.

The RFID performance monitoring system 100 may be used to monitor the performance of RFID systems in various applications. For purposes of illustration, FIG. 2 represents a series of stations in an exemplary embodiment of a portion of a supply chain in which an RFID system may track the movement of articles, and a performance monitoring system 100 may collect performance-related information. This example may represent, for example, an RFID system that is used to track the movement of articles in a distribution center in which various goods may be received, stored, and placed on pallets for shipment to retail customers, for example.

In this example, the sequence of stations begins with the receipt of products, items, or articles to be tracked 205 into the RFID system. In one embodiment, the sensitivity of the tag may be determined at a station 210. Sensitivity may be determined at the station 210 (or other station) using various methods that will be described in detail with reference to FIG. 9. In some embodiments, a station 220 may be a programming station that programs each tag with an identifying serial number, such as an EPC code. The commissioning station 220 has a reader 215 that may be configured to "program" the tag with the assigned EPC, for example. At the commissioning station 220, the tag may further be uniquely associated with information about the product to which it is attached (or otherwise coupled to). As such, an operator may enter the product information and EPC information for storage in a database, such as the databases 20, 22, by using a computer terminal that is coupled to the RFID system 10.

Some or all of these functions at stations 210, 220 may be performed "upstream" of the distribution center. For example, the manufacturer may apply tags to the product, program the tags with an EPC code, and determine the sensitivity of the tag. The manufacturer could then make this information available to downstream RFID systems by storing the information in the shared RFID database 50, or by otherwise distributing the information with the distribution center, such as by VPN or email, for example.

Accordingly, information to be programmed into the tag may be sent from the RFID system 10 to the station 220, and optionally may include other tag or product information. In one embodiment, the RFID system 10 or the RFID performance monitoring system may send configuration information, for example, that instructs the operator how to apply the tag to a particular product. Such information may reflect a corrective action resulting from an analysis of performance-related information that determined that tags on a particular product could be read better by changing the location or orientation at which a tag is applied to the product, for example.

Furthermore, information about the tags and their associated products may be sent from various stations to the RFID system 10 and/or the system 100. Once received, this information may be stored in the databases 20, 22, for example. Other information may also be received from various stations, such as a tag list. A tag list may comprise a list of all the serial numbers in a single group of tags that are read by a reader. The RFID system 10 may compare the received tag list with an expected list of tags to determine if products may be missing. The RFID performance monitoring system 100 may further cross-reference the tag list with other information to determine if tags are not being detected due to performance-related issues.

Other stations in the distribution center may send and receive information with the system 100. In this example, the tags are next read at a station 225, where products are aggregated into pallets (or similar shipping container) and wrapped in plastic for shipping. The pallets may be mixed (including various different products) or homogenous (all one product type). In mixed pallets, the composition, orientation, materials, and configuration of the products within the pallets may be uncontrolled. As such, the location of RFID tags on individual products may vary, and the readability of tags may be subject to the materials on the pallets and the location of the tags within the pallet of goods. Accordingly, the performance monitoring system 100, in some embodiments, may exchange configuration-related information with the station 225.

As the product is being wrapped, for example, on a rotating platform (i.e. spin table), one or more readers may be attempting to read the tags on the pallet. As such, the tag list of read tags may be provided to the RFID performance monitoring system 100. The efficacy of the readings of pallets on the spin table may be a function of several parameters, such as spin speed, number of rotations, pallet configuration, and temporal multiplexing of multiple readers arrayed around the spin table at the station 225. As suggested above with reference to FIG. 1, the system 100 may include control output signals 152 that are coupled to the spin table controller and the readers to operate the station 225 to improve RFID read performance without unnecessarily slowing the operational flow of the pallets through to the next station.

In this example, the next station may be for stocking the pallet on the shelf 230 for subsequent shipment. When ready to ship, a forklift may pick the pallet from the shelf 240. In some embodiments, the pallet is read by a reader associated with the shelf, or a reader 215 on-board the forklift as it is picking or moving the pallet. An on-board communication and computer system may collect and transmit the tag list for the pallet to the RFID system 10 for verification purposes, and/or to the system 100 for data collection purposes. As such, the forklift computer, operator, the on-board reader, and the RFID system 10 may exchange command, data, and control information, for example, using wireless communications.

In some embodiments, the product flow includes reading the products with a reader 215 in a verification tunnel 250 just before being placed on a truck to be shipped, for example. Tracking the movement of articles as they are placed on trucks may have significance, for example, to business processes, such as insurance and invoicing. However, accurate verification of items being shipped may be complicated by numerous factors, including: variable reflections off of moving objects, such as forklifts and other metal items; changes in temperature and relative humidity as the dock door 260 opens or closes; mechanical vibration; radio frequency noise in the environment of the readers; interference from readers of adjacent dock doors; and, other sources of error. To detect these parameters at any of the reader stations, various sensors 142 may be configured to provide parametric information to the RFID performance monitoring system 100.

At any station that provides communication to the RFID performance monitoring system 100, the information received from the station may include timing or time stamp information. Temporal information provides, in some examples, for determining historical trends, or for correlating performance changes with particular parameters, for example. To the extent any performance parameter variations depend on time, such timing event information may be used to identify with greater accuracy sources of performance-related disturbances.

In an alternative product flow, referred to as tag-at-ship, the product may proceed directly from aggregation at station 225 to the dock door 260 without being placed on the shelf 230.

Accordingly, FIG. 2 represents one of many possible paths for goods to flow through the exemplary distribution center, and it depicts only one configuration of RFID stations in the distribution center or other warehouse. In other examples, a performance monitoring system may collect performance-related information with other configurations of the sequence, number, or operation of the RFID stations, as well as in applications or environments other than a supply chain or a distribution center. For example, the sensitivity of an individual tag may be measured after the tag has been commissioned and applied to a product at the station 220. As such, the sensitivity measurement would reflect the sensitivity of the tag as it will be while attached to the product. This sensitivity measurement after application would also take into account the orientation and placement of the tag, as well as any affect the product itself may have on the tag's sensitivity due to factors such as fluid content, shape, or metal content. In another example, the tag sensitivity may be measured both before and after commissioning the tag with a product at the station 220.

In addition to sending tag list information to the system 100, each station in FIG. 2 that reads the tags may also send one or more performance-related metrics, such as the following: time to read 90% of the tags in the tag list; time to read 100% of the tags in the tag list; and, the number of successful reads and number of read attempts for each tag. Other percentages of time may be used, such as time to read 10%, 25%, 50%, 66%, 75%, and 80%, or other value. A time limit may be placed on some or all of the time metrics, such as time to read 100% because, for example, a particular tag may fail or may be unable to be read due to a failure, or a reader may be unable to read effectively. In some embodiments, a reader or set of readers may be configured to read a group (such as a pallet) of tags for a predetermined number of attempts, and record the number of times each tag is successfully read. Timestamp information may be included with the performance-related information provided to the system 100.

Figure 3:
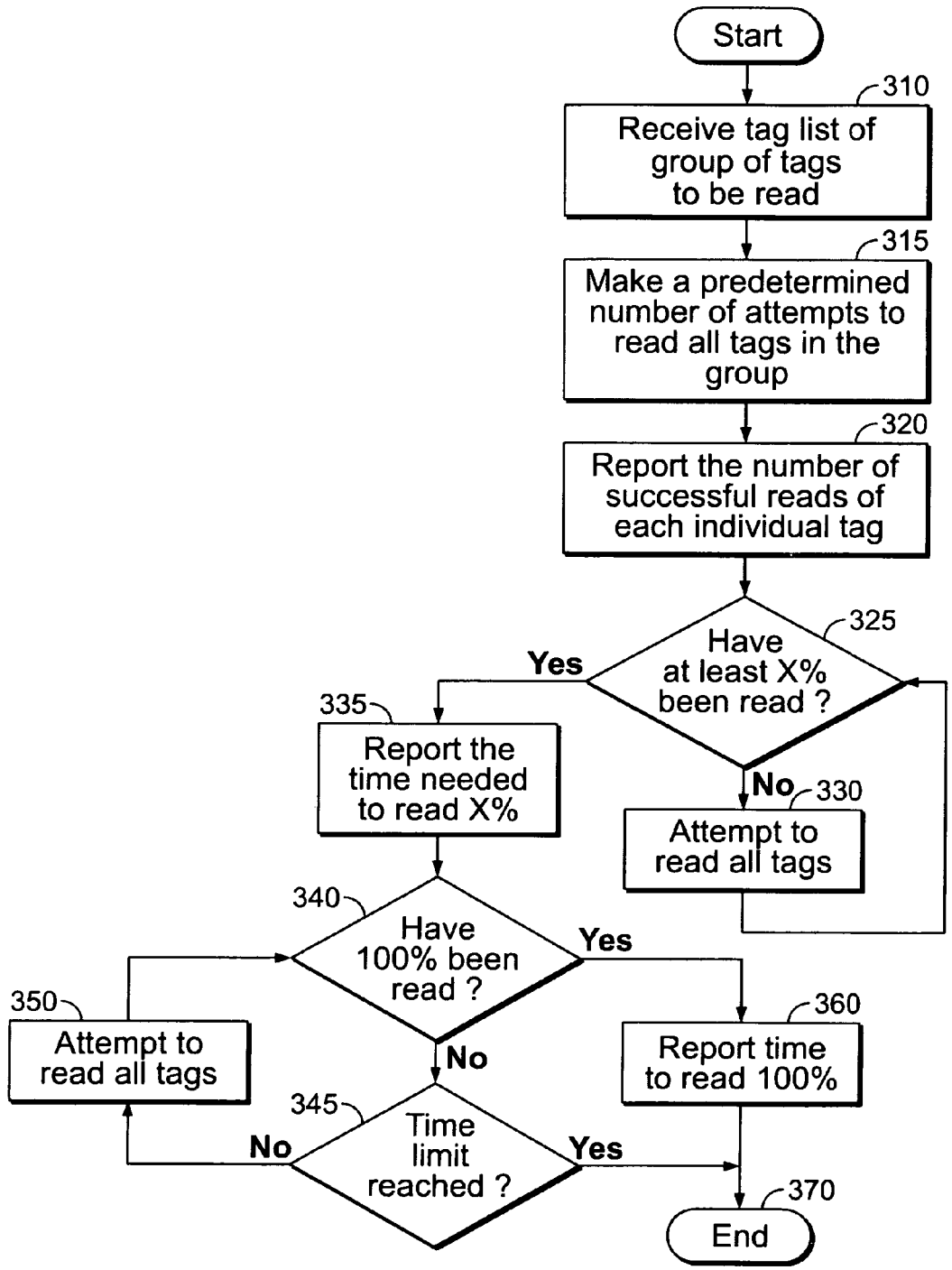
FIG. 3 is a flowchart of a method used with the RFID performance monitoring system.

An exemplary method by which an individual RFID reader may develop such performance-related information while reading tags is described in the flowchart of FIG. 3.

In the FIG. 3 embodiment, a reader receives a list of tags for a group of tags that are to be read at 310. The group of tags may be part of a pallet of products, for example. At 315, the reader may make a predetermined number of attempts to read all tags in the group. The predetermined number of attempts may be 10 or 20, for example. At 320, the reader reports the number of successful reads, also referred to as "hits," for each tag to the RFID performance monitoring system 100. With reference to FIG. 1, this reported information may be stored, at least temporarily, in the performance database 160.

Next, at 325, the tag list of successfully read tags may be compared to the list of tags expected to be in the pallet (or other container or grouping of tags). If less than a predetermined percentage of expected tags have been read, then continued attempts may be made to read the additional tags at 330. If at least the predetermined percentage has been read, then the "time required to read the predetermined percentage" may be reported at 335 to the system 100, and may then be stored in the performance database 160. If less than all of the expected tags have been read at 340, then a timing system is checked to see if a predetermined time limit for making read attempts has been reached at 345. If the time limit has not been reached, then additional attempts to read all the tags may be made at 350. If no time remains at 345, then the read attempts end at 370. If, however, all of the tags have been read at 340, then, at 360, the reader reports the "time to read 100%" to the RFID performance monitoring system 100, and the read process ends at 370. This "time to read 100%" may be stored with other performance metrics in the performance database 160.

In another embodiment, the reader may not receive a list of tags that are expected to be read as described above at 310. Instead, the reader may attempt to read the group of tags a predetermined number of times, and then send a tag list containing the EPC (or other identifying information) for each detected tag to the RFID system 10 and/or to the performance monitoring system 100. In addition, the reader may send information to the system 100 from which the system 100 may determine the performance for the read attempt(s). Such information may include, for example, the number of read attempts, time stamp information about when the attempts were made, and which attempts were successful for each tag.

In the above-described example, certain algorithms were described as being performed within the reader. In alternative embodiments, some computations or decisions may be performed, for example, by or in cooperation with the RFID performance monitoring system 100. For example, the time needed to read X % at 335, or whether the time limit has been reached at 345, may be determined by the system 100. The attempts to read all tags at 330, 350 may be modified to involve the system 100 sending read commands to the reader. The predetermined number of attempts at 315 may be determined by the system 100 based on, for example, an expected error rate, and appropriate commands may be generated to the reader. These and other variations are within the scope of the method.

In some embodiments, for example, the RFID system 10 may send serial read requests to a "non-intelligent" reader, which may send a tag list of tag hits for a single read cycle in response to each command. In other embodiments, the RFID performance monitoring system 100 may send a more complex command that tells an "intelligent" reader how many attempts to make, to which the intelligent reader responds with a tag list and a count of the number of hits of each tag after performing the requested number of reads. Some intelligent readers may be configured to receive, decode, and perform basic and auxiliary functions (described herein) in response to commands from the RFID system 10 or the RFID performance monitoring system 100. Intelligent readers may, for example, be capable of performing certain functions that may otherwise be performed by the middleware server 30.

In various implementations, readers may be activated to perform read operations by other sensors such as optical sensors on a conveyor, motion detectors, proximity detectors, or by operator actions. Tracking the entry and exit of tags or groups of tags (e.g., pallets) into and out of the read field of a reader may involve filters and algorithms that estimate or determine the length of time during which the tags may be read or should be ignored. For instance, a forklift may have a permanently mounted tag (or other beacon or identifier) that uniquely identifies the forklift. When that forklift's proximity to a reader at a dock door is recognized, middleware running on the middleware server 30 can be configured to determine which tags are expected to be present on the pallet on that forklift (for example, by calling on information stored in the WMS 38a). The RFID system 10 can use this information to filter valid tag reads from stray reads.

Processing Information in the Performance Monitoring System

Figure 4:
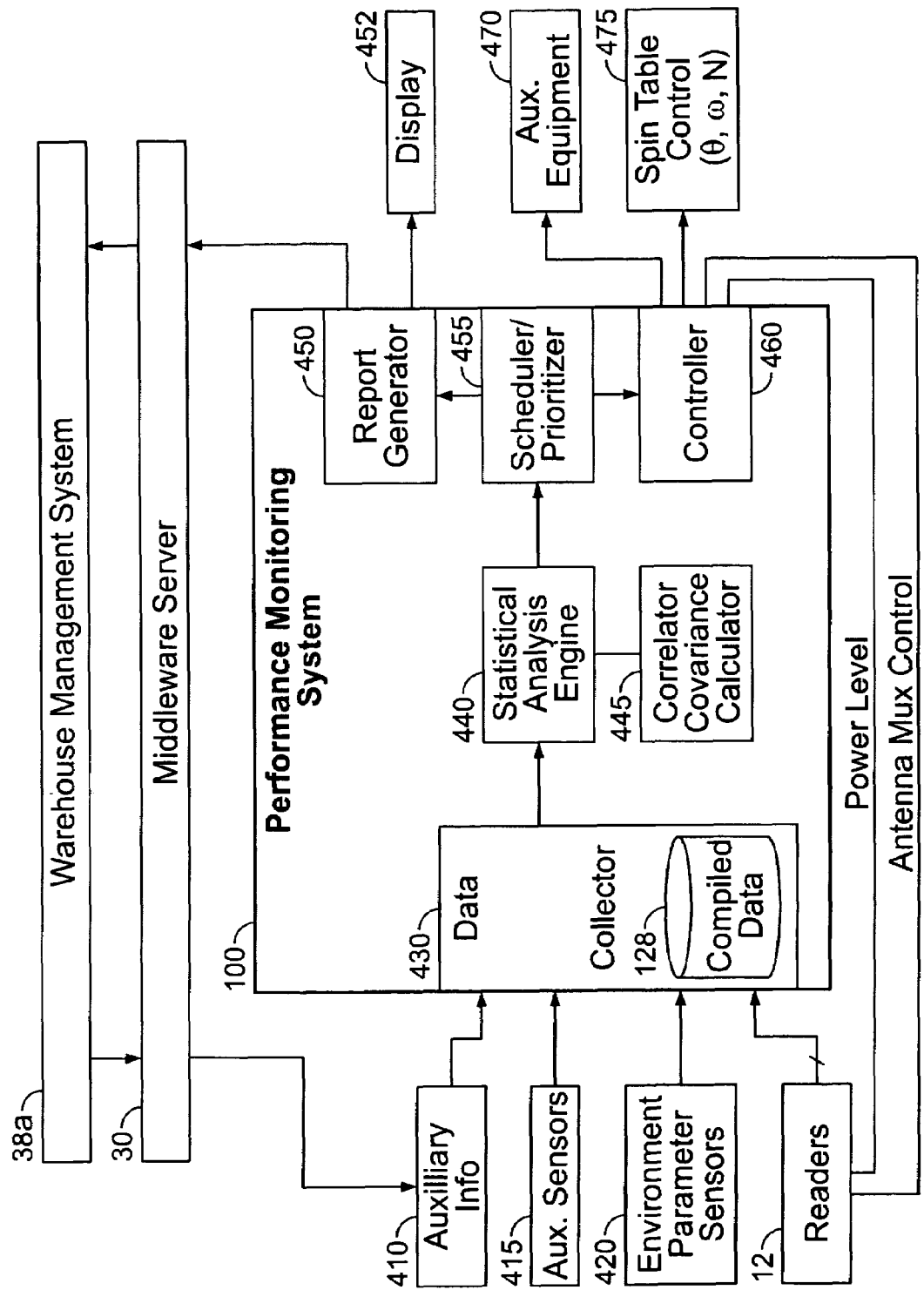
FIG. 4 is a functional block diagram illustrating one aspect of data flows and data processing in an RFID performance monitoring system.

In accordance with the foregoing description, the performance monitoring system 100 may operate to receive input information and transmit output information as shown in FIG. 4. In this exemplary embodiment, the system 100 may collect information, analyze the information, and provides outputs that are based on the analysis.

The system 100 may receive a variety of information as inputs from a range of sources. One source of information is auxiliary information 410, which may provide information from the Internet 32, or from services such as WMS 38a and the middleware server 30. Auxiliary information 410 may include information that may be stored on data storage devices accessible over a network, for example.

Collected auxiliary information may include information about hardware or software associated with the IT, WMS, middleware, RFID operations server, the intranet, or other networked elements. In addition, auxiliary information may include vendor, version, lot code, or other information about the hardware or software used in tags, readers, communication interfaces, and the computing platforms used in the RFID system 10. The hardware or software used in these elements can have an impact on the performance of the RFID system. As such, the system 100 may collect auxiliary information about hardware or software vendors, lot codes, versions, maintenance data, upgrade history, and installation information. Such information may be correlated with changes in the performance of the RFID system 10. For example, hardware changes may affect the amount or quality of data that is collected.

In one embodiment, the auxiliary information may include information about the location of forklifts over time. The location information may be wirelessly transmitted from a position tracking system on-board the forklift. Such location information may be correlated with RFID system performance to determine if the position of a forklift can have a detrimental impact on RFID system performance. If it does, procedures may be developed to mitigate the negative impact.

The system 100 may also receive information from auxiliary sensors 415 and environment parameter sensors 420. Examples of auxiliary sensors include proximity sensors that detect parameters that may affect reader performance. Such parameters may include, for example, the approach of forklifts or other objects in the vicinity of a reader, the position of particular dock doors (i.e., whether open or closed), or the operating state of large machinery that may produce heat, vibration, or electromagnetic interference (EMI).

Examples of environmental parameter sensors 420 may include temperature, humidity, vibration, power line quality, or radio frequency devices. Such environmental parametric sensors may be arranged to collect information about the environment in which the RFID system is operating, and which are believed to have an impact on RFID system performance.

The system 100 may also receive information from each reader 12. The information provided by readers may include tag lists, performance metrics, sensitivity information about each reader itself, information about ambient RF energy (see discussion of FIG. 7), information about the power levels of other readers (see discussion of FIG. 8), and information about the sensitivity of individual tags (see discussion of FIG. 9).

One method of monitoring and/or improving reader power and tag sensitivity measurements includes providing a "golden" target, i.e. a tag of calibrated sensitivity that is placed in the read zone of a reader. In some implementations, measurements of golden tags may be used to compensate the sensitivity measurement of an uncalibrated reader based on the reader's sensitivity measurement of the "calibrated" golden tag(s). As an example, a golden tag may be measured as having a 10 dB sensitivity if measured in a lab with calibrated equipment, but may be measured as having an 8 dB sensitivity if measured by an uncalibrated reader in a factory environment.

Various approaches may be used to identify compensation values that may be applied to compensate measurements from uncalibrated readers. In one example, the reader may attempt to read the calibrated golden tag at various power levels to determine what power level is required for the reader to read each of the golden tags at an acceptable "hit rate." Other exemplary methods of measuring reader sensitivity and power levels are described, for example, with reference to FIG. 8.

Based on diagnostic measurements of one or more golden tags, the system may determine calibration information for each uncalibrated reader. In some embodiments, the calibration information may be post-processed into a set of compensation factors and/or stored, for example, in a memory local to each reader, or in a database remote from the reader.

Once calibration information has been determined, the information may be applied to realize improved sensitivity measurements. In one embodiment, the calibration information may be used to adjust a tag parameter, such as a field strength measurement, or reader parameters, such as gain, attenuation, frequency response, or power level, for example. Compensation information may also be used to adjust the sensitivity test procedure (see, e.g., FIG. 9) parameters such as, for example, the distance(s) and/or locations of the tags relative to the reader when making sensitivity measurements. The calibration information may also be applied to computations performed in software or firmware, including adjustments to digital filters (e.g., FIR, IIR) or other digitally processed computations. Accordingly, compensating the measured sensitivity values to correct for reader calibration errors may improve the accuracy and uniformity of tag sensitivity measurements within the system. More accurate sensitivity measurements may yield improved accuracy in determining performance metrics associated with individual RFID tags, as well as improved overall performance of the RFID performance monitoring system 100.

Figure 9:
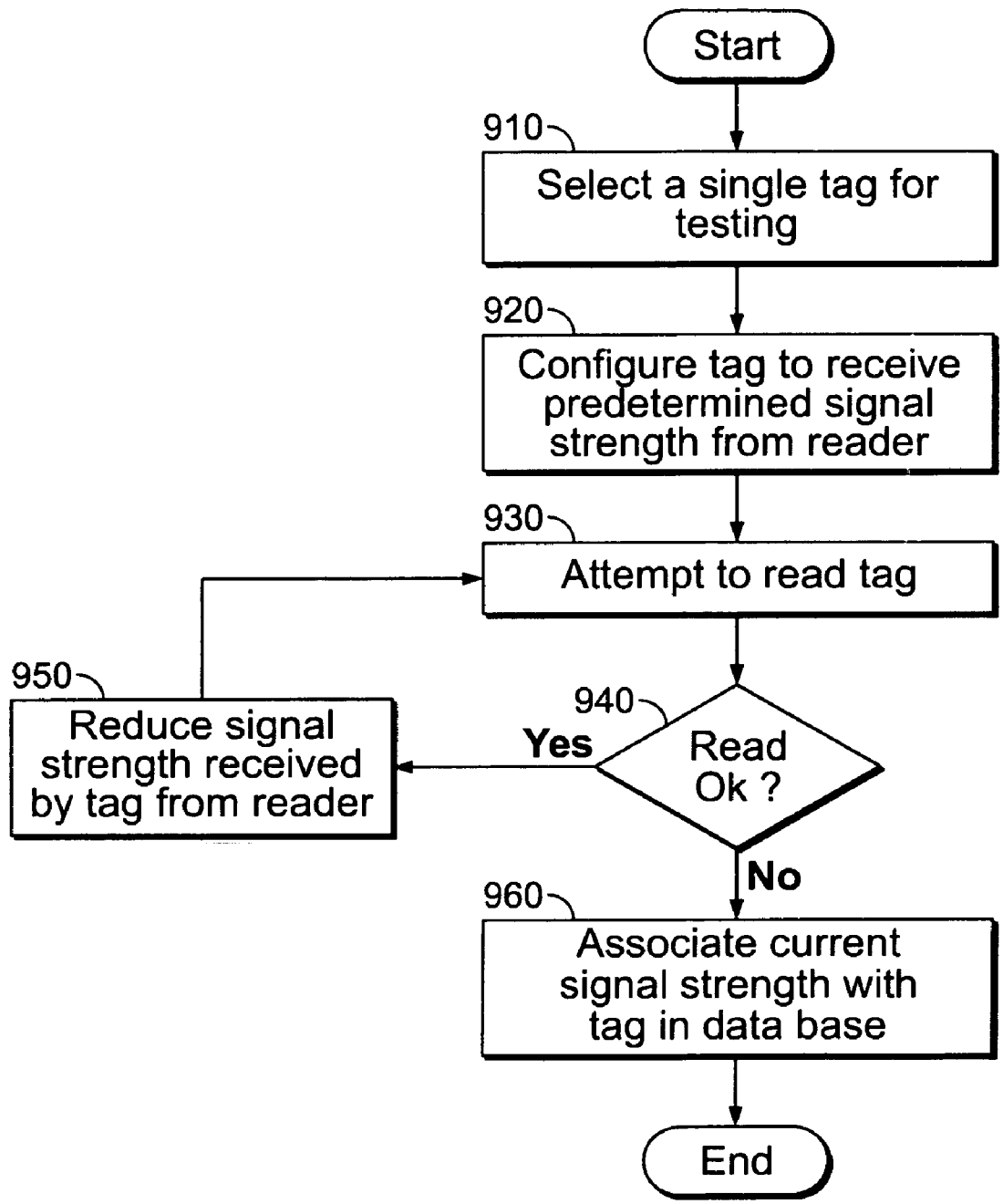
FIG. 9 is a flowchart of a method of measuring the sensitivity of a tag.

Performance metrics for individual tags may include, for example, the number of successful reads of a tag from a certain number of attempts; and, the measured tag sensitivity (see, e.g., the station 210 in FIG. 2, and also FIG. 9). Performance metrics for individual readers may include the time to read a predetermined percentage of tags in a tag list, measured reader sensitivity, and measured reader power levels.

The RFID performance monitoring system 100 may initially collect all the performance-related data and information received from sources, such as those described above, in a data collector 430. In some embodiments, the data collector may be implemented as a single database, or as a number of repositories for collecting raw information for later processing, as described above with reference to FIG. 1.

The system 100 may, in some embodiments, be configured to process the compiled data 124 using various analytical tools. Such analytical tools may include statistical tools capable of producing outputs that represent the degree of correlation between parameters. For example, statistical tools may include software capable of computing correlation and/or covariance factors for collected parameter information and performance-related information. Other statistical tools may be used in the analysis, including, but not limited to: minima, maxima, mean, and regression analysis techniques.

In one embodiment, a statistical analysis engine 440 determines which parameters need to be analyzed, retrieves the parameter data from the compiled data 124, performs an analysis, and interprets the results according to programmed instructions. In another embodiment, the statistical analysis engine 440 may be implemented by program instructions executed on the processor 110 (FIG. 1).

The mathematical computations may be executed on the processor 110, or on a math co-processor, such as a digital signal processor (DSP) or other computing element capable of analyzing the compiled data 124 as a correlation and covariance calculator 445, in this example. After the compiled data has been analyzed, parameters that exhibit high correlation factors with one or more of the performance metrics may be marked for reporting, corrective action, or other further scrutiny.

Further scrutiny is one example of an outcome that may result in response to the output of the system 100. As a further example, if the analysis yields as a result that performance is uncorrelated to any of the measured parameters, then a system operator may determine, for example, that sensors should monitor different parameters. This is another example of a response to the output of a report generator 450.

The output from the report generator 450 may be sent to a display 452, such as a printer, or on a display terminal that may include a graphical user interface (GUI). The GUI may incorporate charts, graphs, or other data or values monitored by the system 100. Another output of the report generator may be data that is sent to the middleware server 30, and/or to the WMS 38*a*. The reports may be generated in response to a request from these elements, on a regularly scheduled basis, or in response to an alarm condition, such as when a monitored value crosses a predetermined threshold limit. A scheduler/prioritizer module 455 may assign the schedule and priority of outputs. The module 455 may also assign priority and arbitrate the commands to the controller 460.

The controller 460, which may include the feedback control interface 150 (FIG. 1), may include interfaces, drives, and control elements that may be coupled to control the operation of one or more devices in the RFID system, or in the environment that may affect RFID system performance. The outputs of the controller 460 may control the operation of auxiliary equipment 470, and may control the spin table 470. In addition, the controller 460 may be adapted to control some of the readers 12 by controlling their power levels and, where readers may interfere with one another, by controlling the timing (i.e. multiplexing) of operation of readers 12. The controls signals may be transmitted to programmed devices, such as PLCs, computers, or other industrial control devices and equipment.

The auxiliary equipment 470 controlled by the controller 460 may include, for example, dock doors, heating, cooling or humidity controls, or the operating state of various equipment that may impact RFID system performance. In one embodiment, the auxiliary equipment may include indicators or displays that notify distribution center operators about current keep-out zones around individual readers. For example, if a particular reader is exhibiting a low performance margin, then a display, such as on a positioning system on-board a forklift, may indicate to the forklift operator to maintain certain keep-out zones, which should not be entered whenever that reader is operating.

As another example, a dispenser may be operated to dispense articles onto a conveyor at a controlled distance of separation so that readers reading items on the conveyor are less likely to unintentionally read tags that are near a "read zone." Likewise, the controller 460 may control the conveyor speed to achieve maximum throughput at an acceptable level of RFID tracking performance.

The controller 460 may also be configured to command the operation of the spin table 475 according to the results of the performance analysis. The control commands may determine the angle of rotation of the spin table, the number of rotations, and the speed of rotation.

In another example, an antenna may be mounted to a vertically oriented positioning system near the spin table. A motor drive may be configured to control the vertical position of the antenna in response to control commands from the RFID system 10. The control commands for antenna vertical position may be related to the spin commands. As the spin table rotates a pallet with a number of tags, for instance, the vertical position of the antenna may be changed to maximize the reading effectiveness for tags in the pallet.

The system 100 may monitor which trajectories of vertical position and rotation exhibit the best performance for different pallets. For example, some dry goods pallets may be read faster than pallets that contain significant fluid and/or metal content. Based upon accumulated performance-related information, the optimal control commands may be applied to maximize RFID performance at the spin table. Furthermore, for each pallet type, the system 100 may be operated to tune spin table operating parameters, such as spin rates, vertical antenna motion trajectory, antenna power settings, and antenna multiplexing sequences. If multiple readers are provided to read tags on the spin table 475, then the controller 460 may configure, for example, the number of read attempts, power levels, and the sequence at which the readers are multiplexed. These configuration parameters may be customized and stored in libraries according to pallet type. These libraries may be recalled as needed to achieve maximum performance based on previous analysis and results for the particular pallet configuration, tag and reader configurations, and products in the pallet.

Information Analysis and Corrective Action

Figure 5:
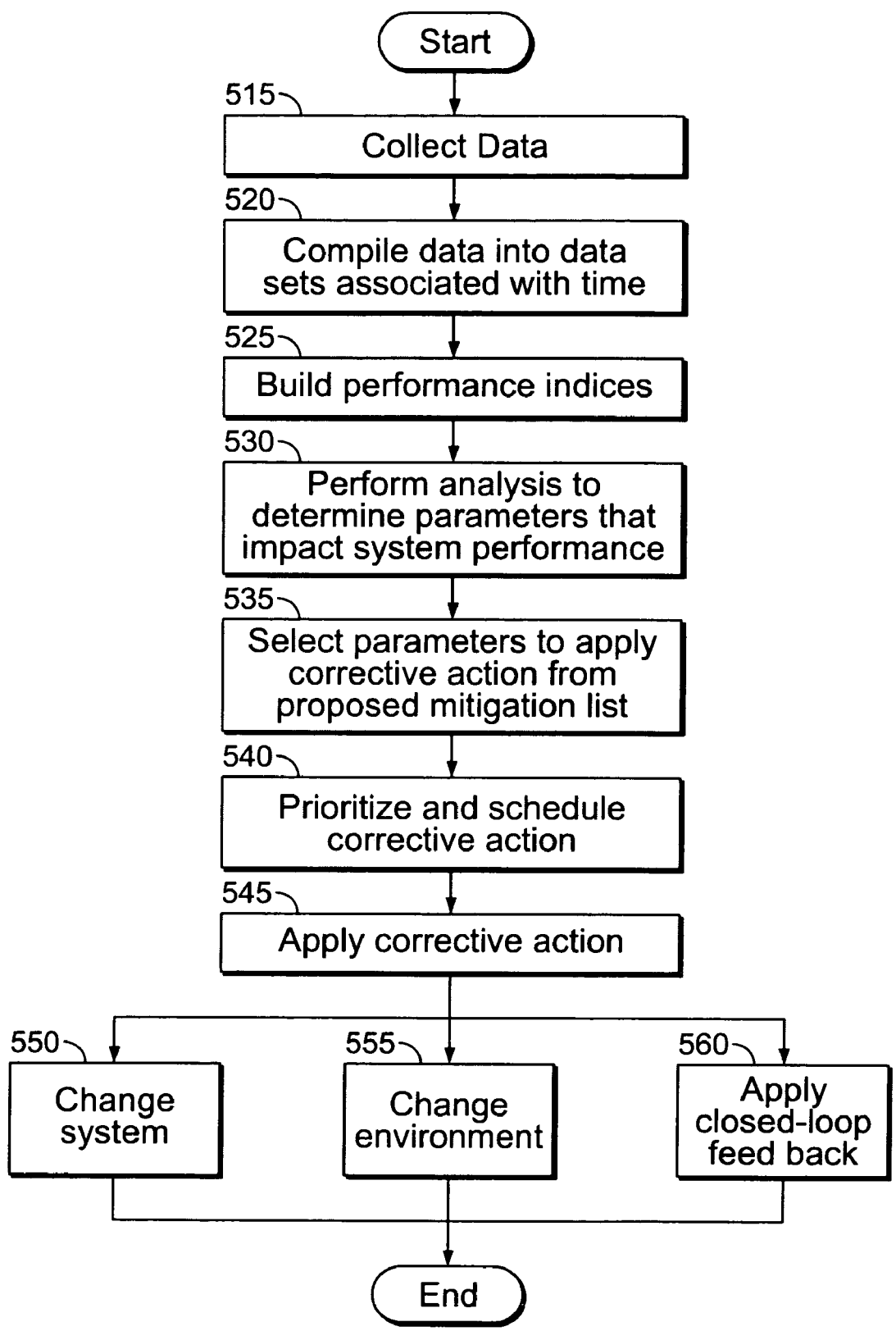
FIG. 5 is a flowchart of a method of applying RFID system performance data to improve RFID system performance.

The RFID performance monitoring system 100 may be operated using the exemplary method shown in the flowchart of FIG. 5. Additional details for an exemplary method of operating the statistical analysis engine 440 are then described in the flowchart of FIG. 6.

The flowchart in FIG. 5 starts with collecting data at 515. In one embodiment, the data collector 430 may collect the data received by the system 100. The data is compiled into data sets that may be associated with time information at 520. In this example, the system creates performance indices at 525. Each performance index may include performance metrics for a predetermined number of previous reads, and may include information for each reader, such as time to read 90% and time to read 100%. During analysis, each performance index may be correlated with various parameters to identify potential causes of sub-optimal performance.

Figure 6:
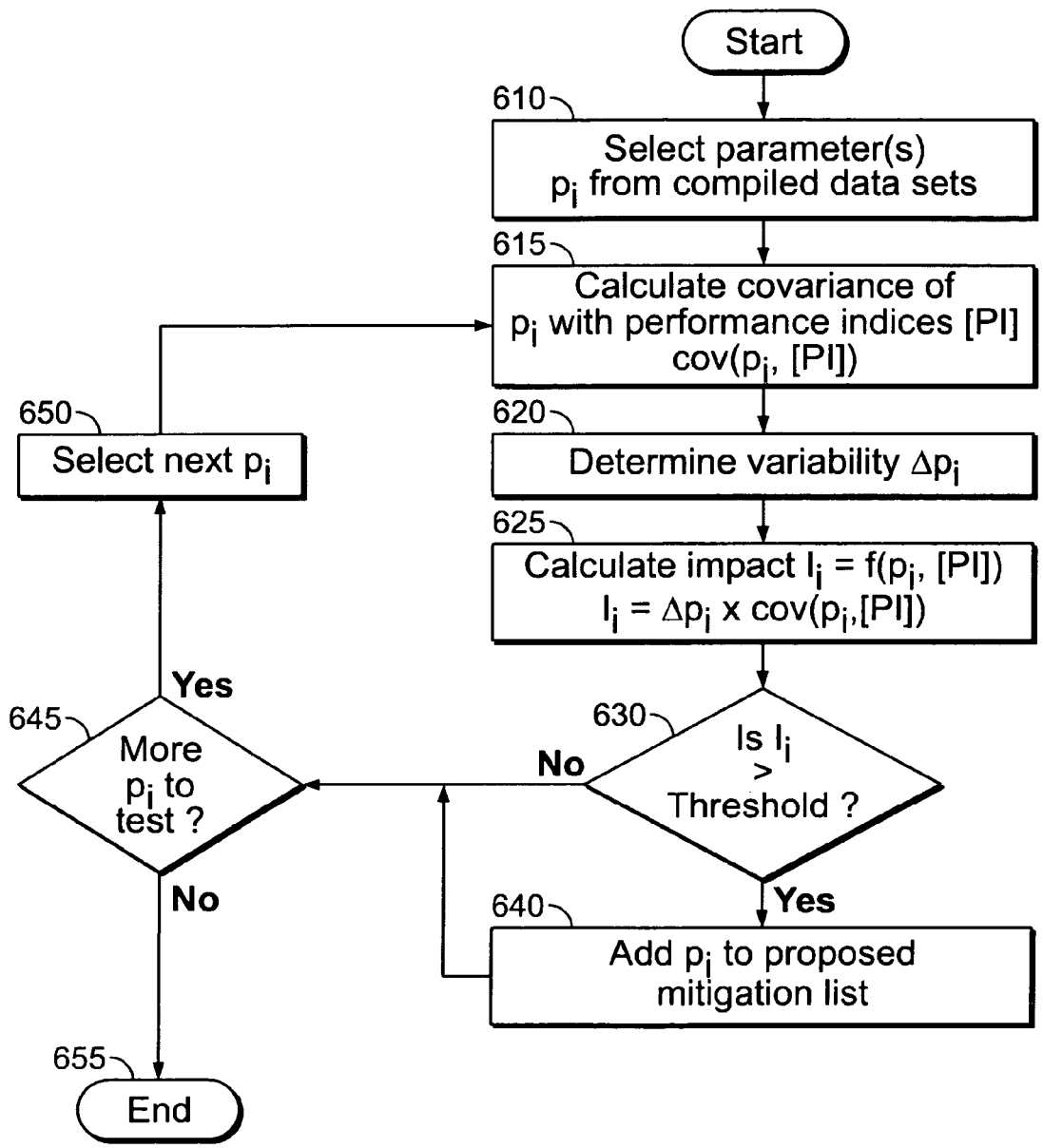
FIG. 6 is a flowchart of a method of analyzing performance data to determine parameters that impact system performance.

As will be described in greater detail with reference to FIG. 6, the system 100 may perform an analysis at 530 to determine which parameters may have a significant impact on the RFID system performance. In an alternative embodiment, a human operator may perform some or all of the analysis. Based on the analysis, the system 100 may select parameters for corrective action and place the selected parameters on a mitigation list at 535. The system 100 may then prioritize and schedule corrective action at 540 by using, in one embodiment, the scheduler/prioritizer module 455. The system 100 may then apply the corrective action at 545. The corrective action may be implemented as changes to the RFID system 10 at 550, as changes to the environment in which the RFID system operates at 555, or as closed-loop feedback at 560. In alternative embodiments, part or all of the steps 530-555 may be performed by human operators.

Although the system 100 may identify some RFID performance problems after a relatively small number of samples have been collected, some of the corresponding corrective actions 550, 555 may have a relatively long time frame. For example, changes to the system 550 may involve repairing or replacing readers or tags, or redesigning the system to add, remove, or modify the type or location of readers, or changing the routes of product flows through the distribution center, for example. Some changes to the system 550 may involve hardware and/or software revision and/or installation. Some changes to the system may involve the antenna design of either the tag or the reader, operating frequency, software of the readers and/or the middleware server 30, and the like. Other changes may include changing the orientation or placement procedures by which tags are attached to items. Product packaging, placement, content, and palletization are all subject to improvement in response to the analysis of the RFID system performance.

Similarly, changes to the environment 555 may involve reducing temperature or humidity variations around readers, for example. Such changes may involve changes to the physical plant so that the local environment around the readers may be controlled. In one example, cooling fans and/or heat lamps may be provided to control the variation of temperature and humidity around readers. In another example, dock doors may be configured to better shield the RFID system from outside ambient EMI sources, such as police cars, communications systems, airplanes, and the like.

The closed-loop feedback at 560 may be implemented using the controller 460 to provide corrective actions that may be automated using feedback control methods or that may be implemented in a relatively short time frame. Some examples of elements that may be controlled by feedback methods include: dock doors; fans; spin table (speed, number of rotations); reader multiplexing; and, reader power levels.

The functions of the steps 525-535 of the method of FIG. 5 will next be described with additional detail in the exemplary method shown in FIG. 6.

The method involves testing sets of parameters stored in the compiled database to identify parameters that may have an impact on performance. Starting with the compiled datasets that were created in step 520, the system 100 may select a set of one or more parameter(s) for evaluation at 610. Next, the system 100 calculates at 615 a covariance of the set of selected parameters and each performance metric in the performance indices that the system 100 created at step 525. The system 100 then determines the variability of the selected parameter at 620. For example, the variability may be measured as the peak-to-peak variation of the selected parameter over a period of time. At 625, the system 100 computes the impact of each parameter on each performance metric by multiplying the covariance computed at 615 with the variability of the selected parameter determined at 620.

In this example, the system 100 compares the computed impact for each performance metric to a predetermined threshold at 630. If the impact is greater than the predetermined threshold, then the system 100 adds the selected parameter to a proposed mitigation list at 640. After 640, or if the impact is less than or equal to the predetermined threshold, the system 100 checks whether more parameters remain to be evaluated at 645.

If more parameters remain to be evaluated, then the system 100 selects the next set of parameters for evaluation at 650, and the evaluation of that set of parameters begins back at 615. Otherwise, the process ends at 655.

The proposed mitigation list may be sorted, for example, by the impact calculated at 625. In one embodiment, the scheduler/prioritizer module 455 may rank the impacts and assign the highest priority to those parameters having the greatest impacts on performance. The report generator 450 may display or otherwise report the highest priority parameters. The controller 460 may take corrective actions to address those parameters having the highest levels of impact on performance.

However, some parameters may be highly observable but not inexpensively controlled. For example, humidity may be inexpensive to measure but expensive to control directly. Humidity sensitivity is primarily caused by the variations in cardboard packaging moisture content changing its radio frequency properties. As an alternative to directly controlling humidity to which packaging is exposed, the sensitivity of readers (or other equipment) to humidity may be reduced by changes to the reader design.

As a further example, it may be determined that the humidity is degrading the signal by changing the characteristics of the products to which the tags are attached. Accordingly, operators may evaluate the feasibility of package changes, or different applications of tags to the products, to improve RFID performance under high humidity conditions.

Potential corrective actions in response to high impact parameters may be further illustrated by another example. If low temperature at a reader is correlated to a 25% impact (decrease) in performance margin for that reader, the controller 460 may increase the reader power level to compensate for the decreased performance margin. Furthermore, if such an increase in the power level of that reader may result in interference with a nearby reader, the controller 460 may also constrain the readers to multiplex, i.e. stay silent while the other reader is operating. Although this may reduce throughput of goods while the temperature is low, the RFID performance level may be maintained, along with the benefits of RFID tracking.

Other mitigation rules may be programmed into the scheduler/prioritizer module 455. In some applications, throughput may be more valued more than RFID system performance. In some instances, the cost functions associated with an available corrective action may only be justified under certain conditions. For example, the energy costs associated with climate control may only be justified for certain products for which RFID tracking accuracy is deemed highly important. Accordingly, the scheduler/prioritizer module 455 may evaluate weighted rules to determine which corrective actions to forego, and in assigning priority to corrective actions.

RFID Readers as Sensors

In addition to the role of RFID readers 12 in the RFID system 10 at stations (see FIG. 2) at which tags may be tracked, RFID readers may also serve as an array of RF sensors. When not actively reading tags, readers may be configured to "listen" with their antennae as receivers of ambient RF energy. Information about the received RF ambient energy may be collected by the RFID performance monitoring system 100. Operation of readers as an array of sensors is illustrated in FIG. 7.

Figure 7:
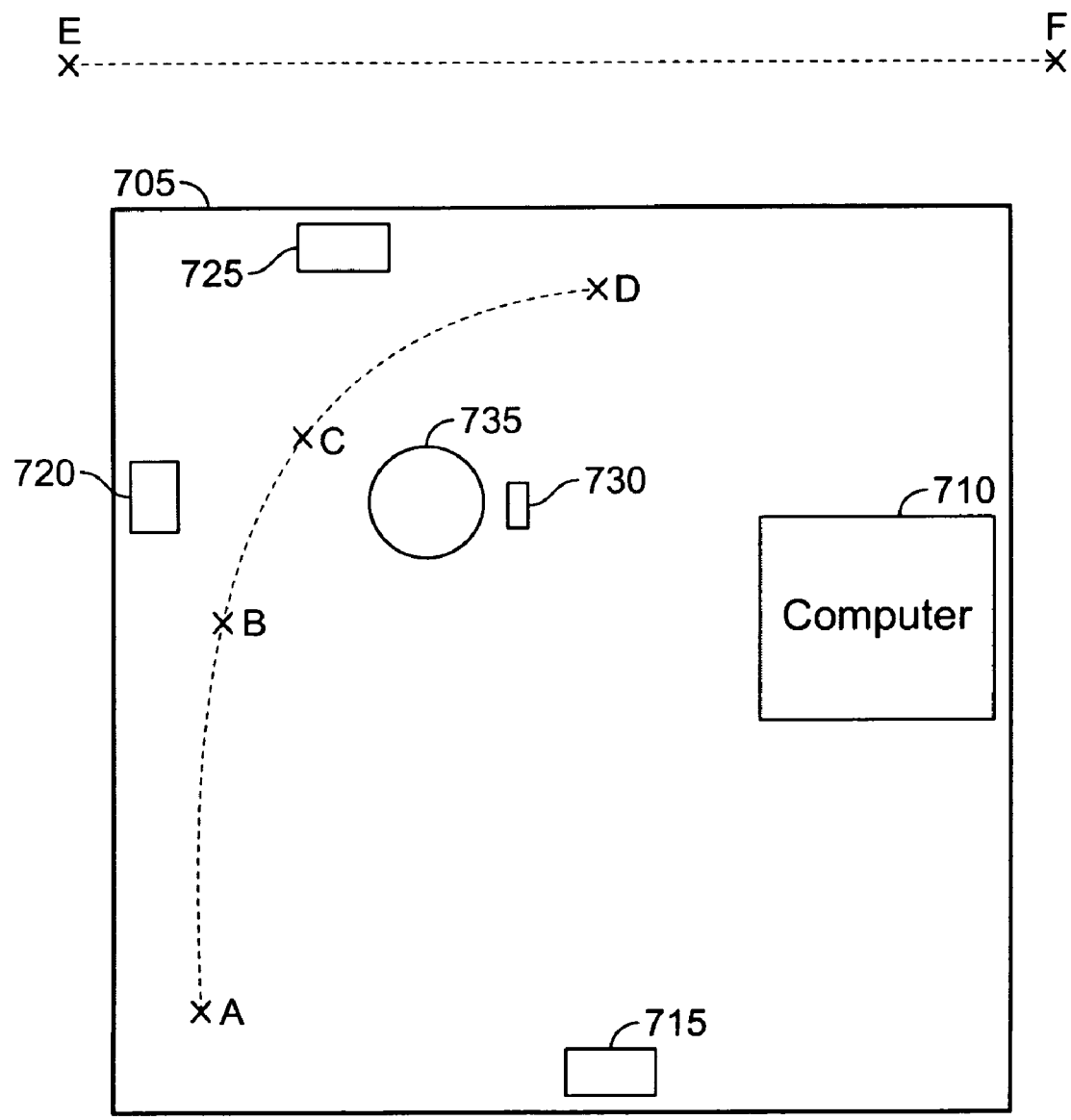
FIG. 7 is a top view of a distribution center in which an array of readers monitors sources of electromagnetic energy.

In FIG. 7, a distribution center 705 includes an RFID system operated by a central computer station 710 with an RFID performance monitoring system. The RFID system includes readers 715, 720, 725, and 730. The reader 730 is configured to read tags on pallets placed on a spin table 735.

Readers 715-730 may be configured to provide information about ambient RF energy to the performance monitoring system during periods when each reader is not actively reading tags.

For one example, a source of RF energy inside the distribution center 705 moves sequentially from point A to points B, C, and D. The source of RF energy may be a radio transmitter on-board a forklift or carried by a security guard.

At point A, the signal strength measured by reader 715 will be relatively strong, and will weaken as the source moves to point B, C, and D. The signal strength measured by readers 720 and 730 will increase between points A-B, peak between points B-C, and fall off between C-D. The magnitudes of the signal strength received by each reader may be recorded at several instants in time. From the known positions of each reader, and the relative strengths of signal received by each reader, the approximate location of the RF source may be determined by triangulation. From this information, an approximate path over time for the RF source may be ascertained. This information may be compiled with other information as a parameter that may be correlated with performance metrics to identify whether the RF source may impact the performance of the RFID system.

For a second example, a source of RF energy outside the distribution center 705 moves from point E to F. The source of RF energy in this case may be the radio transmitter on a vehicle, such as a forklift, a truck, or a police car. In addition to such mobile sources, typical stationary sources of RF energy may include, for example, RF welders, electric motors and drives, lighting systems, and the like.

As in the previous example, the performance monitoring system 100 may monitor the reader 725 to detect the presence of RF energy in the frequency bands of interest to the RFID system. By detecting the presence of RF energy that, for example, peaks in signal strength at the same time some performance metrics dip, an operator may be able to determine that RF energy event(s) may be causing the disturbance, and then proceed to investigate the source of the RF energy. If the source of the EMI can be identified, then a solution may be developed to mitigate the effects of the disturbance. For example, if an RF welder that operates five times per hour on first shift were to cause tags to be missed, then a potential corrective action may be to pause reading for thirty seconds whenever that disturbance signal is detected. Alternatively, power levels may be increased and multiplexing adjusted to avoid reader collisions.

In one exemplary method, a database may be created to include characterization information about the relative signal strengths received by one or more readers when monitoring an RF source at various locations around an RFID system. For example, in a distribution center, relative reader sensitivity levels may be characterized by taking an RF source to various known locations and recording the relative signal strengths received by readers in the system. The characterization information may later be used to help locate the source of an RF emission by comparing the relative received signal strengths of the RF emission to the characterization map.

In another embodiment, the characterization information may be used, in combination with other information, to determine whether sensitivity of individual readers have drifted since the characterization map was developed. Characterization maps developed at different times may also be compared to identify changes in reader sensitivity levels.

Reader characterization may also include using an RF source of known power level and at known locations to determine absolute sensitivity information about readers. By characterizing sensitivity of one or more readers at various known locations around the distribution center, for example, performance-related information about the sensitivity of each reader may be used to enhance the analytical results obtained from the performance monitoring system 100.

Using Readers to Monitor Readers

Figure 8:
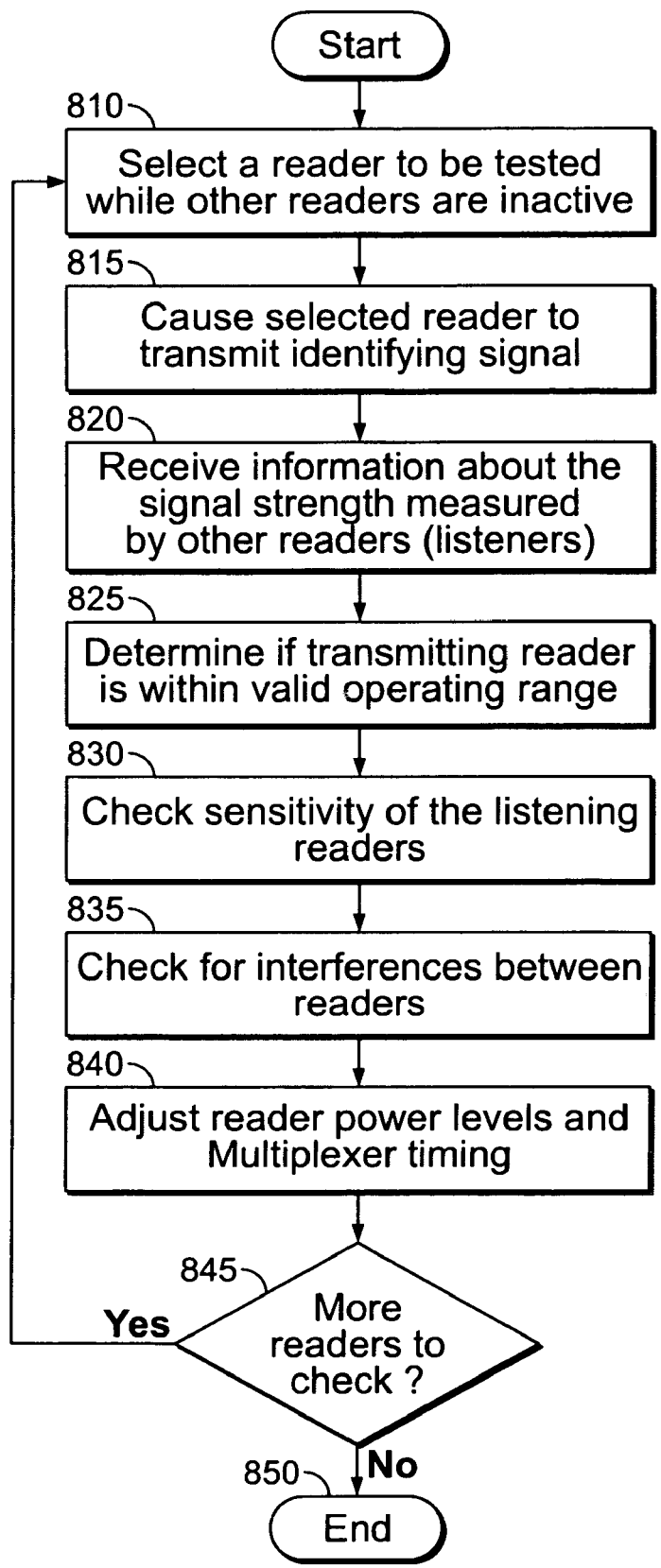
FIG. 8 is a flowchart of a method of using inactive readers to monitor other readers in the RFID system.

Not only can RFID readers be operated as a passive array of sensors for collecting information about ambient RF energy, each RFID reader may be actively operated in a way that allows the performance monitoring system 100 to collect information about other readers in the RFID system 10. Such operation may enable the system 100 to identify reader-related performance problems, or to detect performance trends. One particular problem includes nearby readers interfering with each other, which is called "reader collision." An exemplary method for operating readers to monitor each other is shown in the flowchart of FIG. 8.

An array of readers may be used to identify relative changes in power and sensitivity levels of readers in the RFID system as follows. The method starts with the system 100 selecting a reader during a period in which other readers are inactive at 810. The selected reader is operated to transmit an identifying RF signal (i.e., chirp) at 815, which may comprise a serial number that uniquely identifies the reader. Then, at 820, the performance monitoring system 100 may receive information about the signal strength of the "chirp" received by each reader that is listening. Based on expected and historical values, the system 100 determines if the transmitting reader is transmitting power in a valid range at 825. Next, the sensitivities of listening readers are checked at 830 to determine if any of the readers received an unexpectedly high or low signal strength value.

Continuing with the procedure, the performance monitoring system 100 may then check for interferences between readers at 835, whereby a neighbor reader may be negatively affected by the interfering signal. Moreover, the performance monitoring system may determine whether one reader may inadvertently read tags in the read zone of a neighbor reader.

Based on the measured interference levels, the performance monitoring system may adjust the multiplexing (i.e., timing) and/or the power levels of individual readers at 840. The RFID performance monitoring system, or an operator, may constrain the interfering readers to operate in a multiplexed mode so that they do not attempt to read tags at the same time. In addition, power levels may be decreased to reduce interference between readers, or increased to improve performance.

If readers remain to be checked at 845, then another inactive reader is selected back at 810. If no readers remain to be checked, then the procedure ends 850. The procedure may be repeated as readers experience sufficient intervals of inactivity to check at least one of the readers.

This scheme may be used to generate a "reader collision map." A reader collision map may include for each reader a list of the reader identification numbers and signal strengths it received from other readers. As such, this may comprise a two-dimensional reader collision map that can be updated in real time to adjust reader multiplexing. The reader collision map may also be used as an analytical tool to identify undesirable reflections that may be occurring from walls or other objects. For example, the two-dimensional reader collision map may be overlayed on a physical site map to design and place screens to reduce the RF coupling between interfering readers. For another example, reader timing/multiplexing may be adjusted to control reader collisions.

Tag Sensitivity Information

Knowing the sensitivity and power levels of each reader provides additional information that may be correlated with RFID performance metrics to identify parameters that impact performance. As mentioned above with reference to the station 210 of FIG. 2, the sensitivity of each individual tag may be determined according to a method described in the flowchart of FIG. 9. To the extent that RFID tags of a particular lot code, version, and vendor may have sensitivities that range in value according to a distribution curve, information about the sensitivities of individual tags may enable the RFID system to assess performance-related information more accurately. For example, the below-average sensitivity of an individual tag may help to explain performance-related data that shows below-average performance associated with that tag, and thereby the source of related errors may be more accurately identified.

In the flowchart of the exemplary method of FIG. 9, the process of measuring tag sensitivity begins by selecting an individual tag for testing at 910. The tag is configured to receive a predetermined signal strength from the reader at 920. The configuration refers generally to the RF signal power at the tag, although tag orientation with respect to the radiation pattern of the reader, antenna design, and other objects that affect the radiation pattern at the tag may affect the actual received signal strength. In general, however, the predetermined signal strength may correspond, for example, to the RF energy received by a particular tag in a particular location and orientation relative to a particular reader operating at a particular power level. In one embodiment, the predetermined signal strength is achieved by placing the tag at a known position and orientation relative to a reader being operated at a known power level.

The reader attempts to read the tag at 930. If the tag is read successfully at 940, then the signal strength received by the tag is reduced at 950, and the reader again attempts to read the tag at the new power level at 930. For example, the distance between the tag and reader may be increased, the orientation of the tag may be changed, or the reader power level may be reduced in increments. The increments may be linear, logarithmic, or other relationship to achieve the desired level of accuracy.

In another embodiment, the signal strength may be determined using other methods. For example, the signal strength at 950 may be either increased or decreased to implement a search strategy to determine the tag sensitivity within a range. The search strategy may involve, for example, a search pattern, such as those well known to those skilled in the art of computer programming. For example, using a variation of the golden section search method, the reader power may be adjusted halfway between end-point values between which the desired value is known to lie. For example, if the read is successful at the half-power level, then the power is decreased to halfway between the half-power level and the lower end-point (which may be initially set to zero). If the read is not successful, then the power is increased to halfway between the half-power level and the upper end-point (which may be initially set to maximum power of the reader). This may be repeated until the sensitivity is bracketed between end-point values that are within the desired degree of accuracy.

In addition to improving the identification of sources of performance-related errors, the tag sensitivity information may provide further benefits. For example, tag sensitivity may be used to assess the performance margin of individual readers with a greater degree of precision. Based on a statistical analysis of performance-related information that is adjusted for the sensitivity of individual tags, the performance margin of individual readers may be monitored, weak elements in the system identified, and corrective actions taken before failures occur.

The concept of performance margin may be expressed in various ways. In one aspect, performance margin in an RFID system may be considered to be a measure of how much the RF power may be reduced before the performance falls below an acceptable level. For example, if an acceptable performance level is set to require that all RFID tags on a pallet must be read successfully at least 15 times for every 20 attempts, then the performance margin may be expressed as the change in reader power level at which that threshold is crossed. In this example, if all other parameters are equal, the tags that have the least sensitivity determine the performance margin. Accordingly, information about the sensitivity of individual tags provides an additional parameter that may be analyzed to identify the source of RFID performance errors.

For example, the performance monitoring system 100 may analyze tag sensitivity and other performance-related data and determine that a reader has a performance margin that is trending down over time. The system 100 may trigger an alarm or report that indicates that maintenance procedures should be taken to determine if the reader needs repair or replacement. By taking such corrective action before the reader performance margin falls below zero, downtime and tracking failures may be avoided, thereby saving time and money while maintaining high levels of RFID system performance.

In addition to providing sensitivity information that may be correlated with other performance-related information, the sensitivity information may also be combined with lot, manufacturer, version, and other tag information, for example, that may be stored in the database 22. With or without performance-related information, this tag information may be monitored as a quality control measure. For example, analysis may reveal an undesirable sensitivity rate associated with a particular lot code, version, antenna design, or other tag-related parameter. Once a problem with tag sensitivity has been identified, corrective action may be taken. For example, either the RFID system 10 or the system 100 may send a signal to the WMS 38 and/or to the IT Firm 40, which may be received by the purchasing group in the Firm A. The purchasing group may take appropriate steps to change the procurement of unsatisfactory tags. Other related departments of Firm A, such as accounting, may be appraised that ability to track certain orders has been degraded as a result of low tag sensitivity or failure corresponding to particular products moving through the supply chain. Downstream customers may be notified of the tag sensitivity issue, as well. Furthermore, operators may be instructed to discontinue use of such tags, or to add redundant tags so that product tracking is not compromised.

Accordingly, determination of tag sensitivity and monitoring tag sensitivity in correlation with other parameters that may impact RFID system performance may provide early detection and enable corrective action not available without the tag sensitivity information. As such, sensitivity information may be used directly to enhance RFID system performance, and to enhance the accuracy of the analysis of performance-related information.

In addition to the above-described examples, performance monitoring of RFID systems may be implemented using systems, methods, or computer program products in embodiments other than the examples described above.

For example, by tracking the performance of specific product configurations within pallets, the system may be able to provide useful information on preferred product arrangements for RFID system performance. The various product configurations that may be loaded on a case or a pallet may also have an impact on performance. Pallets may be homogeneous (single product) or mixed (more than one product). The combination of placement, orientation, materials, and the like, may affect the transmission of the reader RF signals to tags, and the response signal from the tag to the reader. In this regard, certain product configurations may perform better than others may. Accordingly, the system may collect information necessary to make such a determination.

The RFID performance monitoring system 100 may be implemented as a computer system that can be used with embodiments of the invention. The processor 110 is capable of processing instructions for execution within the system 100. In one embodiment, the processor 110 is a single-threaded processor. In another embodiment, the processor 110 is a multi-threaded processor. The processor 110 is capable of processing instructions stored in the memory 120 or on a storage device.

The memory 120 stores information within the system 100. In various embodiments, the memory 120 may be contained in a computer-readable medium, a volatile memory, or a non-volatile memory. The system may also include a storage device capable of providing mass storage for the system 100. In various embodiments, the storage device may be a computer-readable medium, a floppy disk device, a hard disk device, an optical disk device, or a tape device.

The display 452 may be an input/output device that provides input/output operations for the system 100. In embodiments, an input/output device may include a keyboard and/or pointing device, or a display unit for displaying graphical user interfaces.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In one embodiment, the system may, for example, automatically alert an operator if a particular parameter is determined to have fallen out of a predetermined range or crosses a predetermined threshold limit. In another embodiment, the system may be configured to take corrective action, such as closing certain dock doors, signaling keep-out areas, generating orders relating to the purchase of tags, and turning on/off air conditioning equipment (e.g., HVAC, fans). The system may be configured to display parameters, trends, and correlation data for interpretation by an operator.

In other embodiments, the monitoring may involve multiple input signals that provide information about the performance of an RFID system. In a particular embodiment, this performance monitoring may be achieved, in part, by collecting information from a number of reader stations in the RFID system. Additional sensors, such as environmental temperature and humidity, may achieve further information collection. Once collected, such information may be analyzed by the performance monitoring system to statistically correlate system performance with the collected information, including time. One of the monitored parameters may include time. By identifying relationships between RFID system performance and environmental parameters, solutions may be targeted to mitigate their effects.

A number of embodiments of the invention have been described. Nevertheless, it will be understood that various modifications may be made without departing from the spirit and scope of the invention. For example, advantageous results may be achieved if the steps of the disclosed techniques were performed in a different sequence, if components in the disclosed systems were combined in a different manner, or if the components were replaced or supplemented by other components. The functions and processes (including algorithms) may be performed in hardware, software, or a combination thereof. Accordingly, other embodiments are within the scope of the following claims.

What is claimed is:

1. A computer program product (CPP) tangibly embodied in a machine-readable storage device, the computer program product comprising stored instructions that, when executed, cause a device to perform operations to determine the sensitivity of a radio frequency identification (RFJD) tag, the operations comprising:
   measure the sensitivity of a tag by stimulating the tag with radio frequency (RF) signals at least once at each of a plurality of field strengths and attempting to read the tag at each of the plurality of field strengths and determining a first field strength at which the tag is successfully read at an error rate that is less than a first predetermined error rate;
   store one or more values that represent the measured sensitivity in an information repository separate from the tag; and
   associate the stored values with an identifier that is uniquely associated with the tag.

2. The CPP of claim 1 further comprising instructions that, when executed, cause a device to perform operations to identify sources of performance-related errors, the operations comprising:
   capturing performance-related data of a reader reading tags having stored values; and
   adjusting the captured data based on the stored values.

3. The CPP of claim 2, wherein the operations further comprise associating with the identifier at least one of the following: a lot identifier for the tag; a manufacturer identifier for the tag, and a version identifier for the tag.

* * * * *

UNITED STATES PATENT AND TRADEMARK OFFICE
CERTIFICATE OF CORRECTION

PATENT NO. : 7,518,519 B2  Page 1 of 1
APPLICATION NO. : 12/002688
DATED : April 14, 2009
INVENTOR(S) : Michael S. Sullivan et al.

It is certified that error appears in the above-identified patent and that said Letters Patent is hereby corrected as shown below:

Column 1
Line 8, delete "in" and insert -- a --
Column 18
Line 38, after the word "system" insert -- 10 --
Column 26
Line 39, delete "(RFJD)" and insert -- (RFID) --

Signed and Sealed this

Fourth Day of May, 2010

David J. Kappos
*Director of the United States Patent and Trademark Office*